United States Patent
Dunphey et al.

(10) Patent No.: US 9,197,643 B2
(45) Date of Patent: Nov. 24, 2015

(54) APPLICATION AND PERMISSION INTEGRATION

(71) Applicant: Bank of America Corporation, Charlotte, NC (US)

(72) Inventors: Jennifer Hardison Dunphey, Charlotte, NC (US); Thomas J. Manjally, Edison, NJ (US)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 13/947,380

(22) Filed: Jul. 22, 2013

(65) Prior Publication Data

US 2015/0026773 A1 Jan. 22, 2015

(51) Int. Cl.
H04L 29/06 (2006.01)
(52) U.S. Cl.
CPC ............... *H04L 63/10* (2013.01); *H04L 63/08* (2013.01)
(58) Field of Classification Search
CPC ............................... H04L 63/08; H04L 63/10
USPC ............................................................ 726/4
See application file for complete search history.

(56) References Cited

U.S. PATENT DOCUMENTS

| 7,580,850 | B2 | 8/2009 | Lurie |
| 7,708,202 | B2 | 5/2010 | Hawkins |
| 8,015,058 | B2 | 9/2011 | Fowler et al. |
| 8,100,325 | B2 | 1/2012 | Hawkins |
| 8,160,916 | B2 | 4/2012 | Moukas et al. |
| 8,750,265 | B2 | 6/2014 | Scherzer et al. |
| 2004/0249983 | A1 | 12/2004 | Bedner |
| 2006/0072760 | A1 | 4/2006 | Gates |
| 2007/0150482 | A1 | 6/2007 | Taylor et al. |
| 2007/0294698 | A1 | 12/2007 | Thoelke et al. |
| 2009/0013052 | A1 | 1/2009 | Robarts et al. |
| 2010/0050240 | A1 | 2/2010 | Conway et al. |
| 2011/0013569 | A1 | 1/2011 | Scherzer et al. |

(Continued)

FOREIGN PATENT DOCUMENTS

EP 1811740 A1 7/2007

OTHER PUBLICATIONS

Office Action in related U.S. Appl. No. 13/967,077 mailed Oct. 29, 2014.

(Continued)

*Primary Examiner* — Kambiz Zand
*Assistant Examiner* — Benjamin Kaplan
(74) *Attorney, Agent, or Firm* — Banner & Witcoff, Ltd.; Michael A. Springs

(57) ABSTRACT

Systems, methods and apparatuses of integrating applications in an application integration system are provided. In some examples, work-based applications may be integrated with personal applications, such as in an application region. One or more rules for accessing the applications within the application region may be determined or defined. In some examples, accessing the application region (e.g., via login or other authentication process) may provide access to all applications within the application region, without requiring additional login or authentication for each particular application being accessed. Further, the system may determine one or more rules for providing communication and/or data sharing between the one or more applications within the application region, between applications within the application region and outside the application region, between two or more applications regions, and the like.

21 Claims, 10 Drawing Sheets

(56) References Cited

U.S. PATENT DOCUMENTS

| | | |
|---|---|---|
| 2012/0198067 A1 | 8/2012 | Weiss et al. |
| 2012/0330926 A1 | 12/2012 | Rajan et al. |
| 2013/0018879 A1 | 1/2013 | McConnell et al. |
| 2013/0091537 A1 | 4/2013 | Parla et al. |
| 2013/0117358 A1 | 5/2013 | Ricard |
| 2014/0026220 A1 | 1/2014 | Gehrig, Jr. |
| 2014/0059668 A1 | 2/2014 | Holloway et al. |
| 2014/0164178 A1 | 6/2014 | Adjaoute |

OTHER PUBLICATIONS http://www.sugarcrm.com/feature/mobile-crm, date unknown, printed Apr. 24, 2013.

http://www.resco.net/mobilecrm/, date unknown, printed Apr. 24, 2013.

http://www.cwrmobility.com/, date unknown, printed Apr. 24, 2013.

http://www.salesforce.com/crm/sales-force-automation/mobile-crm/, date unknown, printed Apr. 24, 2013.

http://www.zoho.com/crm/reports-dashboards.html, Date unknown printed Apr. 24, 2013.

"Blackberry 10"; Mar. 28, 2013.

APPLICATION AND PERMISSION INTEGRATION

BACKGROUND

Today's work environment is becoming increasingly untethered. For instance, people are using mobile devices when away from the office environment to continue working and improve efficiency. In some conventional systems, people are using work-based applications and personal applications on the same devices (whether mobile device, desktop device or other type of device). Because of the various permissions and access restrictions associated with some work-based applications, there may be limited or no communication or data sharing between the work-based applications and the personal applications. This may cause inefficiencies for the user who may be required to login in separately to each application and who may be precluded from accessing necessary information housed in one application that may be useful in another application. Further, each application must have separate security and/or access rules which can be cumbersome and may lead to inconsistencies.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for integrating applications in an application integration system. In some examples, work-based applications may be integrated with personal applications, such as in an application region. One or more rules for accessing the applications within the application region may be determined or defined. In some examples, accessing the application region (e.g., via login or other authentication process) may provide access to all applications within the application region, without requiring additional login or authentication for each particular application being accessed. Further, the system may determine one or more rules for providing communication and/or data sharing between the one or more applications within the application region, between applications within the application region and outside the application region, between two or more applications regions, and the like.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Various systems, methods, and apparatuses are discussed herein that provide integration of one or more applications. For instance, a user may have a device that implements a plurality of work-based applications (e.g., applications provided by an employer or used in the course of business) and personal applications. The work-based applications may have permissions, security settings, and the like that are controlled by the employer or entity providing the applications. In some conventional arrangements, one or more access or security settings may prevent those work-based applications from communicating with or sharing data with one or more personal applications on the same device. However, arrangements described herein provide for integration of the work-based and personal applications such that communication and data sharing may occur between the two types of applications based on one or more rules provided by an application integration system. Various aspects of this application integration arrangement will be discussed more fully below.

Figure 1:
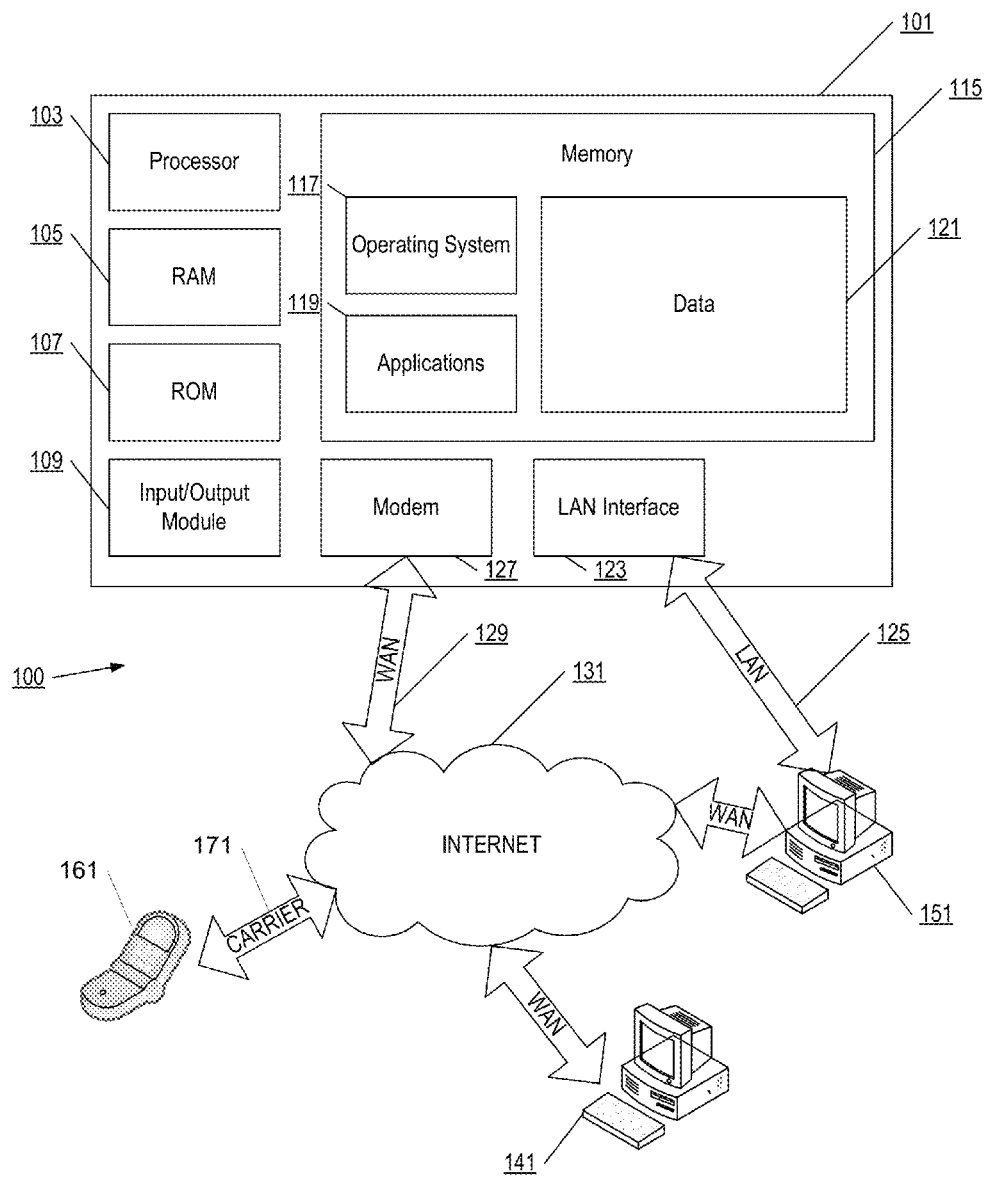
FIG. 1 illustrates an example operating environment in which various aspects of the disclosure may be implemented.

FIG. 1 illustrates an example block diagram of a generic computing device 101 (e.g., a computer server) in an example computing environment 100 that may be used in one or more illustrative embodiments of the disclosure. For example, the generic computing device 101 may correspond to a server in application integration system, as described in examples below. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mobile device, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. Computing device 161 may be a mobile device (e.g., smart phone) communicating over wireless carrier channel 171.

It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, tablet computers, and the like) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
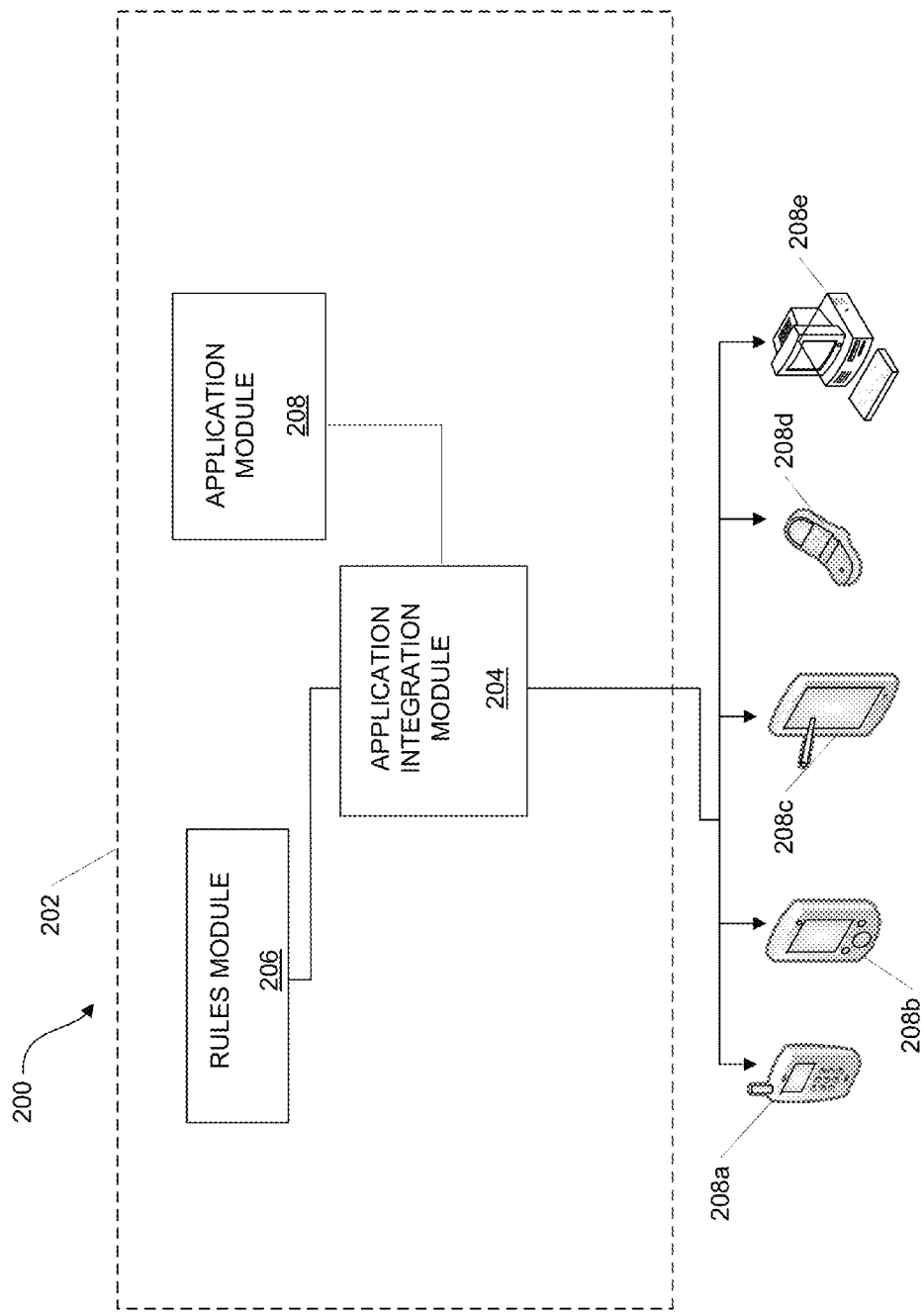
FIG. 2 illustrates an example application integration system according to one or more aspects described herein.

FIG. 2 illustrates one example application integration system 200 according to one or more aspects described herein. In some examples, the application integration system 200 may be part of, internal to or associated with an entity 202. The entity may be a corporation, university, government entity, and the like. In some examples, the entity 202 may be a financial institution, such as a bank. Although various aspects of the disclosure may be described in the context of a financial institution, nothing in the disclosure shall be construed as limiting the application integration system to use within a financial institution. Rather, the system may be implemented by various other types of entities without departing from the invention.

The application integration system 200 may include an application module 208. The application module 208 may include hardware and/or software configured to perform various functions within the system 200. In some arrangements, the application module 208 may store one or more applications. For instance, the application module 208 may store a plurality of applications of various types. That is, in some examples, a device may be provided to a user by an entity, such as the employer of the user. In these arrangements, the device may include applications associated with the employer (e.g., one or more applications used to perform various work functions such as work email, calendar or other appointment function, word processing applications, spreadsheet based applications, note taking applications, data storage applications, and the like). The device may also include one or more personal applications, such as a personal email application, one or more applications the user uses for purposes other than work, social media applications, electronic book reading applications, global positioning system (GPS) based location or mapping applications, and the like. These applications may be stored, for example, in an application module 208.

The applications contained within application module 208 may each have different access or permissions associated therewith. For instance, one or more applications associated with the employer or work functions, may have a higher level of security associated with it than one or more personal applications. In some examples, within the application module, one or more applications may be prevented from communicating with and/or sharing data with one or more other applications because of the different security or permission settings associated with the applications.

The application integration system 200 may further include an application integration module 204. The application integration module 204 may integrate one or more applications, such as applications associated with application module 208, such that the applications may communicate and/or share data with each other. In some examples, the application integration module 204 may identify one or more applications, such as those stored in application module 208, and may determine applications belonging to a set or type of application. For instance, the application integration module 204 may identify applications provided by the entity or employer or applications used for work purposes, and may also identify one or more applications used for personal or non-work purposes. The application integration module 208 may integrate these applications such that the applications are accessible from an application region having a single login, as will be discussed more fully below.

In some examples, integration of the applications by the application integration module 204 may be based on one or more rules, such as rules stored in rules module 206. The rules module 206 may include rules for accessing one or more applications associated with the application module 208 and integrated by the application integration module 204. In some examples, the rules module 206 may identify, determine and/or implement rules permitting access to one or more applications, such as those integrated by the application integration module 204. In one particular example, the rules module 206 may include rules governing the access, security, permission, and the like of each module integrated by the application integration module 204.

For instance, the rules module 206 may store rules associated with permission, access, security, and the like of each application (such as each application in application module 208). As discussed above, the permissions, security, access, and the like of each application may be different from other applications based, in some examples, on the type of application (e.g., whether it is a work-function based application associated with an employer or a personal application). Accordingly, the rules module 206 may then identify rules including permissions, security, access and the like for access and/or use of the applications as or after they are integrated, such as by the application integration module 204.

For example, the rules module 206 may store the rules associated with one or more applications in the application module 208. When one or more applications are integrated, such as to allow access between, data sharing, communication between, and the like, the rules module 206 may determine rules for security, permissions, access, and the like of the integrated version of the application(s). In some examples, the integrated applications may be within an application region. The application region may include rules associated with security, access, permissions, and the like that determined by and/or stored in the rules module 206. Accordingly, by accessing the application region, a user may access all of the applications within the application region. In some arrangements, access to the application region may require a login or other authentication. In these arrangements, login to the application region may permit access to all applications within the application region without requiring any additional login or authentication (such as for an individual application).

The rules module 206 may also determine the various rules associated with data sharing and/or communication between one or more integrated applications. For instance, the rules module 206 may include overall rules for applications of a first type or set communicating with applications of a second type or set. Additionally or alternatively, the rules module 206 may include rules specific to one or more applications. For instance, the rules module 206 may determine that data may be shared between application 1 of the first set of applications and application 3 of the second set of applications, but not between application 1 of the first set of applications and application 2 of the second set of applications. Various other rule arrangements will be discussed more fully below.

In still other examples, integration of the applications, such as by the application integration module 204, may include creation of a plurality of application regions. The rules module 206 may then include rules associated with security, access, permissions, and the like of the plurality of application regions. Additionally or alternatively, the rules module 206 may determine rules of data sharing, communication, and the like between each application region and/or between one or more applications associated with different application regions, as will be discussed more fully below.

The application integration system 200 may be accessible via a user interface on a computing device 208. In some examples, the computing device may be a computing terminal, such as terminal 208e. In other examples, the computing device may be a module device, such as smartphone 208a, personal digital assistance (PDA) 208b, tablet computer 208c, cell phone 208d, notebook or laptop computer, and the like. The computing device 208 may permit a user to access one or more applications, such as the integrated applications to simplify access to applications and work more efficiently by sharing data and communicating between applications. In some examples, the system, and the associated integrated applications, may be accessible via any type of computing device, regardless of manufacturer, operating system and the like. Further, these systems, capabilities, functionalities, and the like can be implemented on multiple devices (e.g., a tablet computer, a smartphone, a desktop and a laptop).

For instance, in an example in which the entity 202 is a financial institution, a banker (user) may have several clients and may be in his or her office for only a limited amount of time each week. Accordingly, many users may use mobile devices such as cell phones, smartphones, tablet computers, and the like, to conduct business. However, in conventional system, all applications may be isolated from each other (e.g., might not share data or communicate) because of one or more security or permissions of the application. The system and method described herein allow applications on a device, such as a mobile device described above, to be integrated with each other. Thus, based on the rules determined for each application, they may be able to share data (e.g., cut or copy and paste between applications), communicate with each other (e.g., access data stored in a work-based data storage application from a personal application), and the like. In some examples, the integrated applications may also share an authentication or login process so that a user logs in to the system and can access any of the integrated applications within the system without requiring any additional log in or authentication. Alternatively, some applications may include a rule requiring an additional authentication. In still other examples, some functions within an application may require additional authentication for heightened security. For instance, a user may access an application without providing additional log in information but if, for example, the user desires to change a document stored on the system, additional authentication may be required in order to ensure that user has authority to make the desired change.

The system and arrangements described here may permit users to work more efficiently by reducing or eliminating the need for additional log in or authentication. It may also improve efficiency by permitting communication and data sharing between applications.

Figure 3:
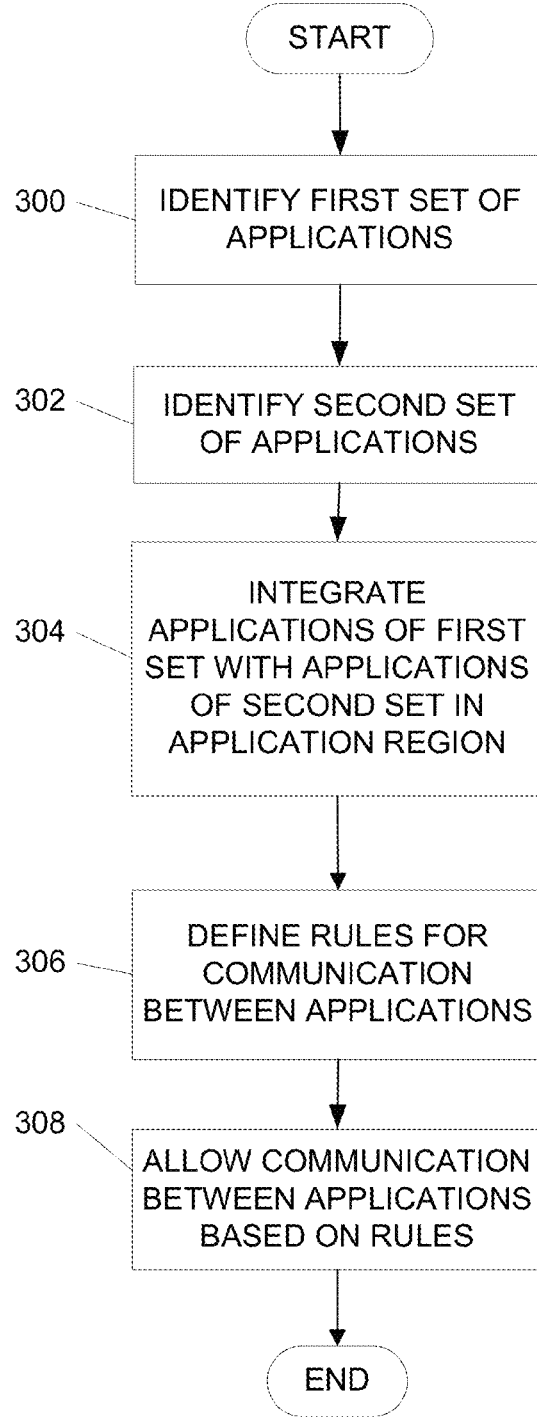
FIG. 3 is an example method of integrating applications according to one or more aspects described herein.

FIG. 3 illustrates one example method of integrating applications according to one or more aspects described herein. In step 300, a first set of applications is identified. In some examples, the first set of applications may be applications of a first type, such as applications associated with an entity or employer of a user (e.g., applications used in the course of the user's business). In step 302, a second set of applications may be identified. In some arrangements, the second set of applications may be of a second type, such as personal or non-business applications. In some examples, access to the first set of applications may be different from access to the second set of applications. For instance, the first set of applications may require one or more login or authentication processes. Further, because, in above example, the first set of applications are applications provided by the entity or employer or used in the course of business, the entity or employer may control access to the application(s) (e.g., permission settings and the like). These permissions and access may be different from those of the applications in the first set of applications (e.g., the personal or non-business applications). Accordingly, because of one or more permissions, security measures, and the like, applications from the first set of applications may not be permitted to communicate with application of the second set in a conventional environment.

In arrangements described herein, applications of the first set of applications may be integrated with applications of the second set of applications, such as in step 304. Once integrated, the applications may be within an application region. In some examples, the application region may have various rules, permissions, and the like for accessing the applications, as discussed above. Further, in some examples, authenticating a user to the application region may provide access to any of the applications within the application region (e.g., the integrated applications) without requiring any additional login or authentication the one or more of the individual applications. The application region may, in some instances, also permit one or more applications to share one or more routines in order to operate more efficiently.

In step 306, one or more rules for communicating and/or sharing data between applications, such as within the application region, as well as applications outside the application region, may be determined. In some examples, rules may be determined that apply to all applications within the application region. Additionally or alternatively, one or more rules determined may be specific to one or more particular applications. Thus, there may be generic rules that apply to all applications, as well as specific rules that apply only to particular applications. In some arrangements, the rules determined may include rules for communication between application regions (in systems having multiple application regions, as discussed above) and/or may include rules for communication between applications within the application region and outside the application region.

In step 308, communication and/or data sharing may be permitted between applications, application regions, and the like, based on the determined rules.

Figure 4:
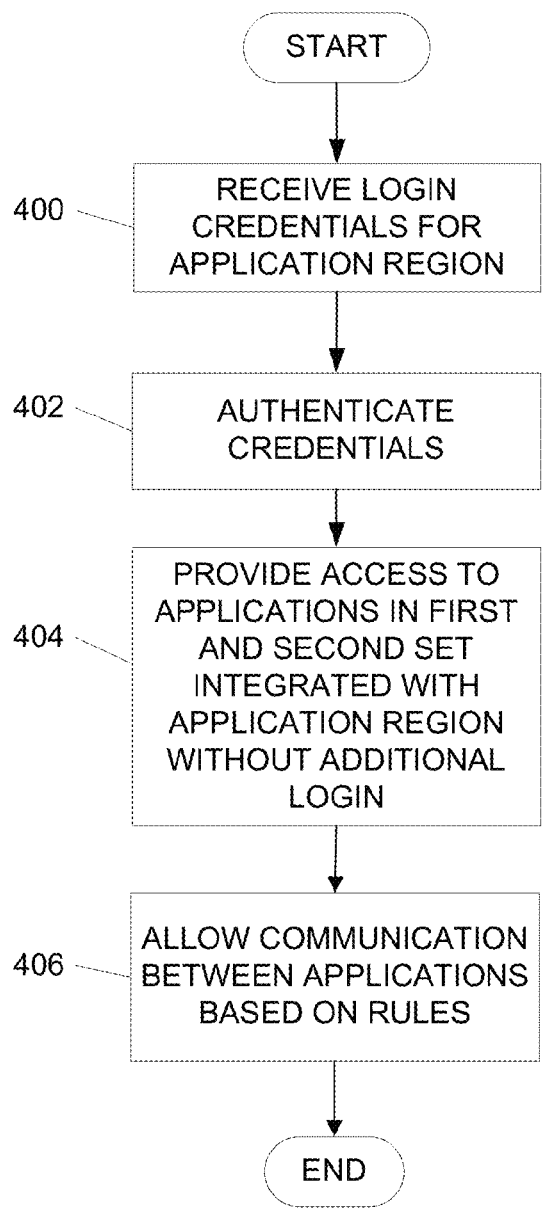
FIG. 4 is one example method of providing access to the integrated applications according to one or more aspects described herein.

FIG. 4 illustrates one method of providing access to the system according to one or more aspects described herein. In step 400, login credentials are received in order to access the integrated applications of the application region. Login credentials may include a username or other unique identifier, password, biometric data, and the like. In step 402, the credentials are authenticated. In step 404, access to the integrated applications (e.g., the applications of the first set and the applications of the second set in FIG. 3) is provided. As discussed above, in some examples, no additional log in or authentication may be required in order to access these integrated applications. In step 406, the applications may be permitted to share data and or communicate with other integrated applications (and/or applications outside of the application region) based on various rules for communication (such as rules determined in step 306 in FIG. 3). Thus, the user accessing the system may be permitted to share data between applications, access information via one application that is generally only accessible via a second application, and the like.

Figure 5A:
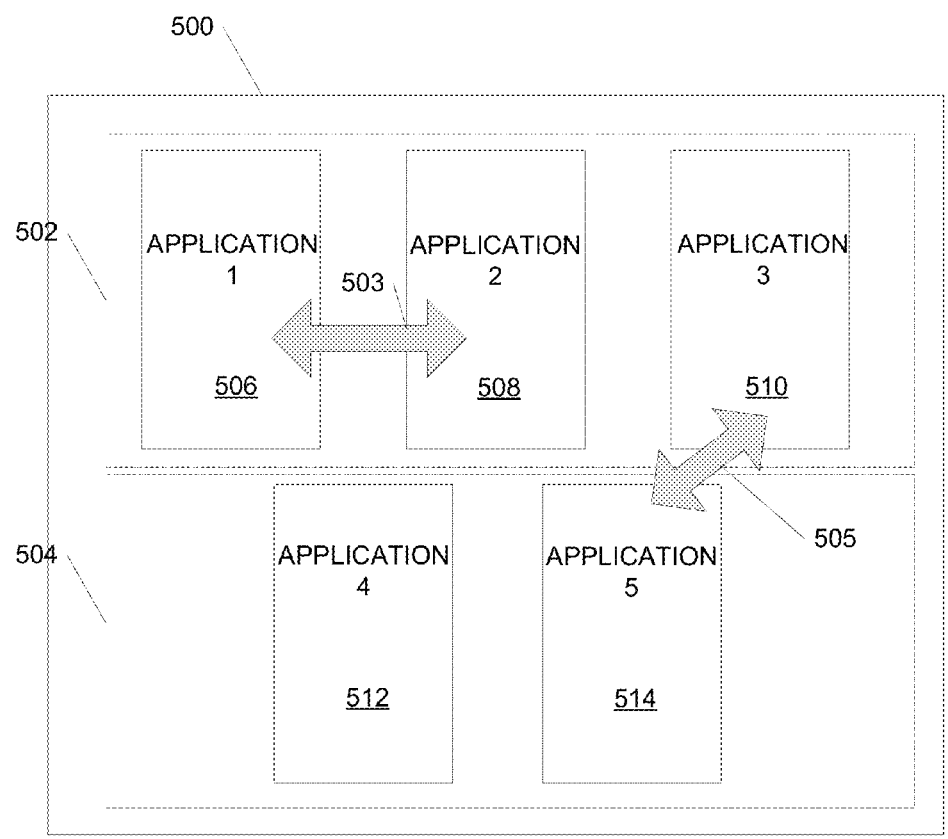
FIGS. 5A-5C illustrate example rules for communication and/or data sharing between applications according to one or more aspects described herein.
Figure 5B:
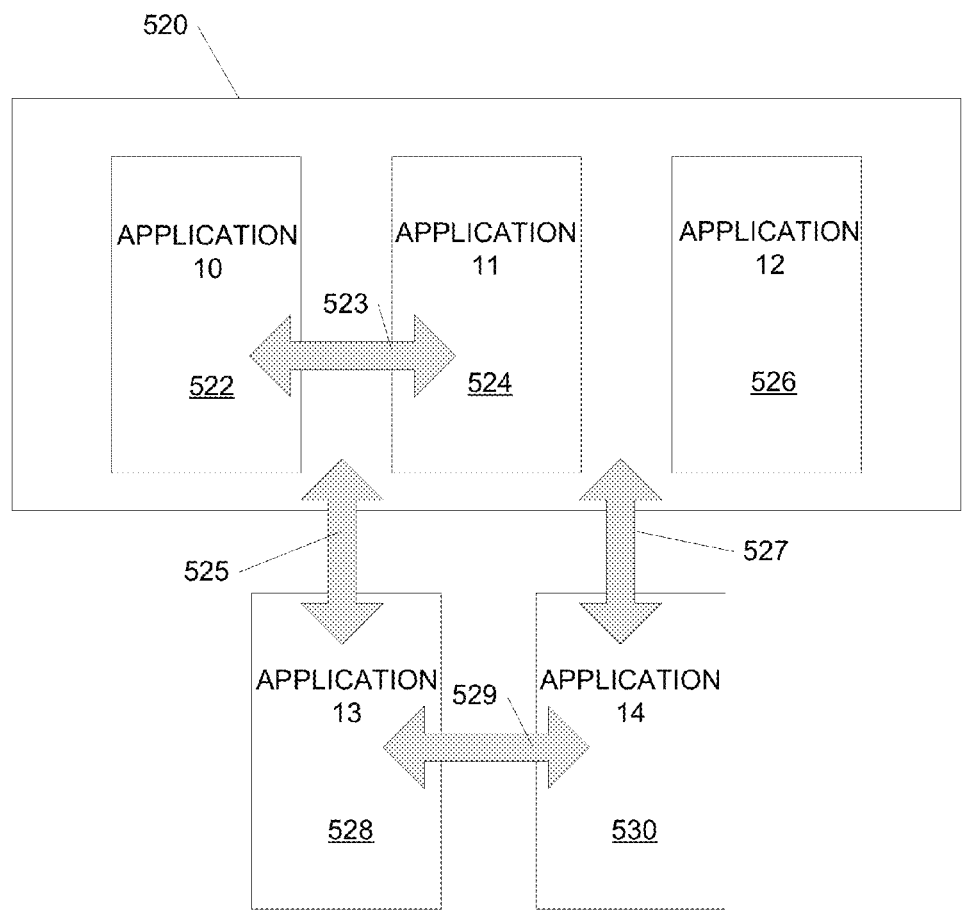
Figure 5C:
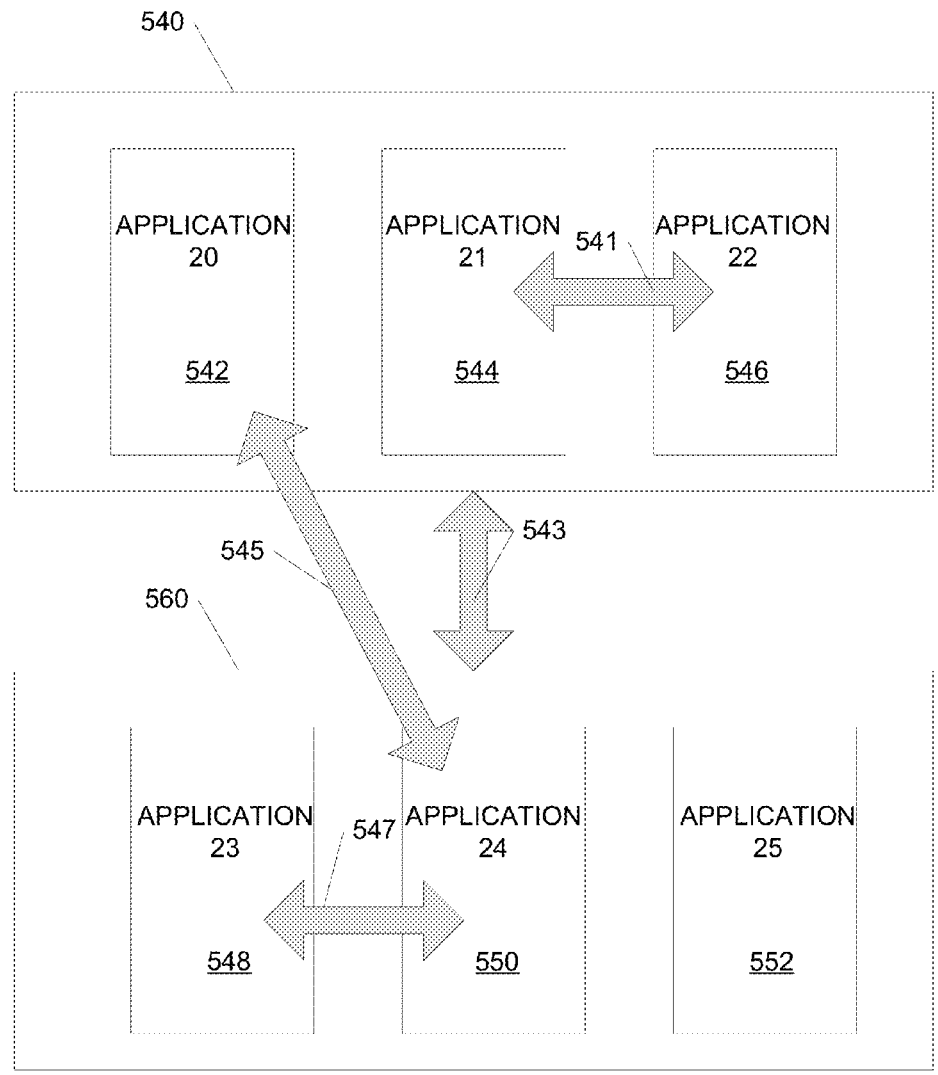

FIGS. 5A-5C illustrate various rule arrangements for permitting access to one or more applications and for providing communication and/or sharing data between one or more applications, according to aspects described herein. Although various rules, communication and sharing arrangements will be described in conjunction with these figures, various other rules, permissions, access, communication and/or data sharing arrangements may be used with the system without departing from the invention. Nothing described in the specification and figures should be viewed as limiting the system to only the rule arrangements described herein.

FIG. 5A illustrates one arrangement in which a plurality of applications are integrated within an application region 500. The applications within the application region 500 are associated with a first set 502 or a second set 504 of application, as discussed above. For instance, the first set of applications 502 may include work-based applications (e.g., those provided by employer or used in the course of business), while the second set of applications 504 may include personal applications. However, the applications 506-514 may be integrated and, as indicated by the various arrows in FIG. 5A, communication, data sharing, and the like may be permitted between one or more applications in either set or between sets. As discussed above, the communication, data sharing, and the like, may be based on one or more rules determined for each application (such as by rules module 206 in FIG. 2). Although five applications are shown in FIG. 5A, more or fewer applications may be used with the system without departing from the invention.

For example, as shown in the arrangement of FIG. 5A, rules may provide for a particular communication and/or data sharing between applications within the same application set (e.g., Application 1 506 and Application 2 508 within application set 1 502 as indicated by arrow 503). Additionally or alternatively, rules may be provided for communication between application in each set (e.g., Application 5 514 of application set 2 may be communication and sharing data with Application 3 510 of application set 1 as indicated by arrow 505). The arrows 503, 505 indicating communication and/or data sharing are provided as merely some examples of communication and/or data sharing rules. More or fewer rules applying to more or fewer applications may be provided without departing from the invention. In some examples, rules may be provided that apply to all applications within the application region 500. Additional rules may be provided and may apply to other applications within the application region 500 without departing from the invention.

Examples of particular communication and data sharing rules with respect to FIG. 5A are provided below. This is merely one example and nothing in the example should be viewed as limiting the invention to only the arrangement described in this example.

Application 1 506 and Application 2 508 may both be work-based applications. For instance, Application 1 506 may be a work email application, while Application 2 508 may be a marketing data storage application. In one example, the rules may be permit communication and sharing of marketing data between these 2 applications and may permit cutting and pasting of data from, for instance, Application 2 508 to Application 1 506 as indicated by arrow 503.

In another example, Application 5 514 may be a personal application while Application 3 510 may be a work-based application. For instance, Application 5 514 may be a GPS or other location based application providing maps, directions, and the like. Application 3, for instance, may be a work contacts storage application (e.g., name, physical address, email address, phone numbers, and the like, of work contacts). In some examples, the system may permit data sharing and/or communication between these two applications, as indicated by arrow 505, such that a user may identify a location, such as a physical location, of a work contact and obtain directions to the location.

FIG. 5B illustrates another example of data sharing and communication rules between applications according to one or more aspects described herein. In this arrangement shown herein, several integrated applications 522-526 are shown within application region 520. Other applications 528, 530 are shown outside of application region 520. In some examples, these applications might not be integrated with the applications 522-526 within the application region 520. However, one or more rules may exist for communication between integrated applications 522-526 within the application region 520 and the applications 528, 530 outside the application region, as indicated by arrows 523, 525, 527, 529.

As indicated by the arrows 523, 525, 527, 529 shown in FIG. 5B, various rules are shown for communication and/or data sharing between these integrated applications 522-526 and other applications 528, 530 outside the application region 520. For instance, the system may include rules for permitting application and/or data sharing between Application 10 522 and Application 11 within the application region 520, as indicated by arrow 523. Additionally or alternatively, one or more rules may exist for communication and/or data sharing between Application 13 528 and the application region 520, as indicated by arrow 525, as well as Application 14 530 and the application region 520, as indicated by arrow 527. In some arrangements, these rules may include some general data sharing and/or communication capability that may, for instance, apply between each application 522-526 within the application region 520 and Application 13 528 and/or Application 14 530. Further, rules may exist for permitting communication and/or data sharing between Application 13 528 and Application 14 530, as indicated by arrow 529.

Examples of particular communication and data sharing rules with respect to FIG. 5B are provided below. This is merely one example and nothing in the example should be viewed as limiting the invention to only the arrangement described in this example.

In one example, applications 522-526 may be work-based applications while applications 528 and 530 are personal applications. For instance, Application 13 528 may be an electronic book reading application. One or more rules may exist for permitting communication and/or data sharing between this electronic book reading application and any of the applications within application region 520 such that the user may copy and paste portions of the book (e.g., in a note-taking manner), as indicated by arrow 525.

In other examples, although not indicated by arrows in FIG. 5B, rules may exist for communication and/or data sharing between one or more of applications 528, 530 and a particular application within the application region 520. For instance, one or more rules may exist for sharing data and/or communicating between Application 14 530 and Application 12 526.

FIG. 5C illustrates yet another example of rules for communication and/or data sharing between applications according to one or more aspects described herein. In the arrangement shown, two application regions 540, 560 are shown. Each application region 540, 560 includes a plurality of applications integrated within. As indicated by the arrows in FIG. 5C, rules for communication and/or data sharing are provided between application region 540 and application region 560 (as indicated by arrow 543), as well as between applications within each application region (e.g., Application 22 544 and Application 23 546, as well as Application 23 548 and Application 24 550), as indicated by arrows 541 and 547). Rules for communication between applications within each application region 540, 560 are also shown (e.g., Application 20 542 and Application 24 550), as indicated by arrow 545.

Examples of particular communication and data sharing rules with respect to FIG. 5C are provided below. This is merely one example and nothing in the example should be viewed as limiting the invention to only the arrangement described in this example.

In one example, arrow 543 may indicate general communication and/or data sharing rules between application region 540 and application region 560. For instance, arrow 543 may indicate a rule that may permit contacts and associated information to be shared between all applications in application region 540 and application region 560.

In another example, arrows 541 and 547 may indicate rules for particular applications to communicate and/or share data. For instance, Application 21 544 may be a marketing data application and Application 22 546 may be a word processing application. In some examples, both applications may be work-based applications, e.g., provided by an employer or used in the course of business. The rules, permissions, and the like indicated by arrow 541 may, for example, permit cutting and pasting of data between the applications in order to utilize marketing data stored in Application 21 544 in one or more documents being created or edited in Application 22 546.

As mentioned above, various other rule arrangements may be used without departing from the invention. Nothing in the examples described with respect to FIGS. 5A-5C, or another aspect of the disclosure should be viewed as limiting the arrangements to only those rule examples discussed.

Figure 6:
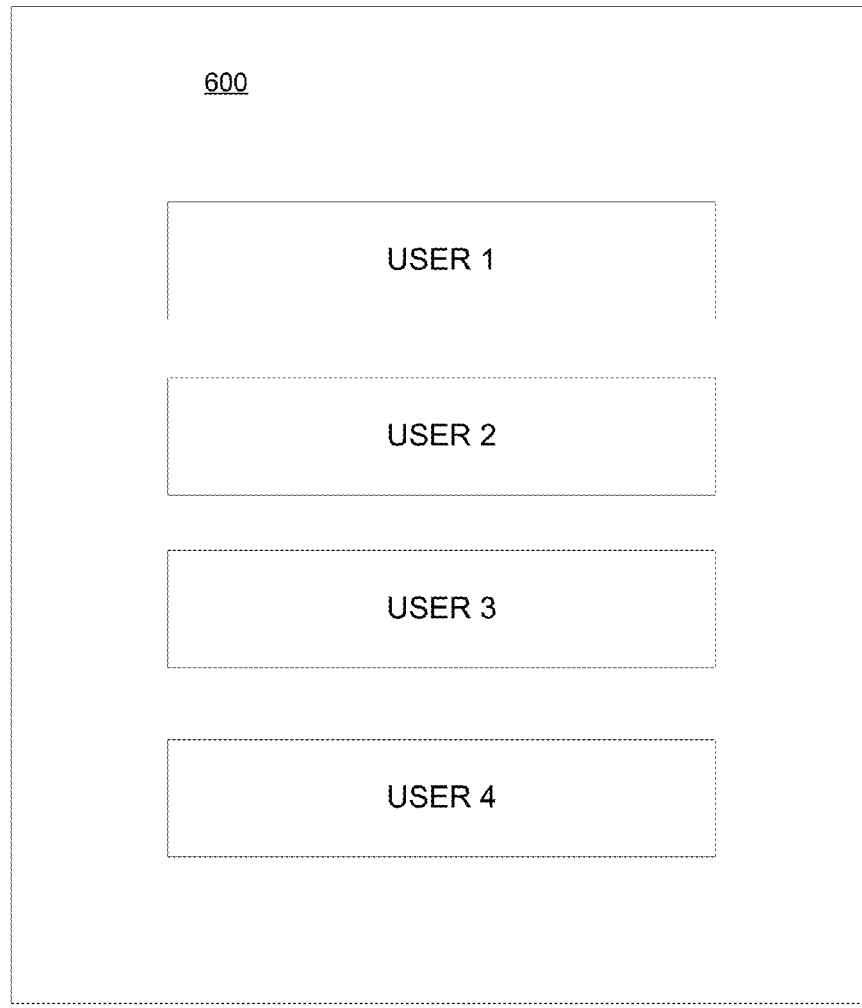
FIG. 6 illustrates one example user selection interface according to one or more aspects described herein.
Figure 7:
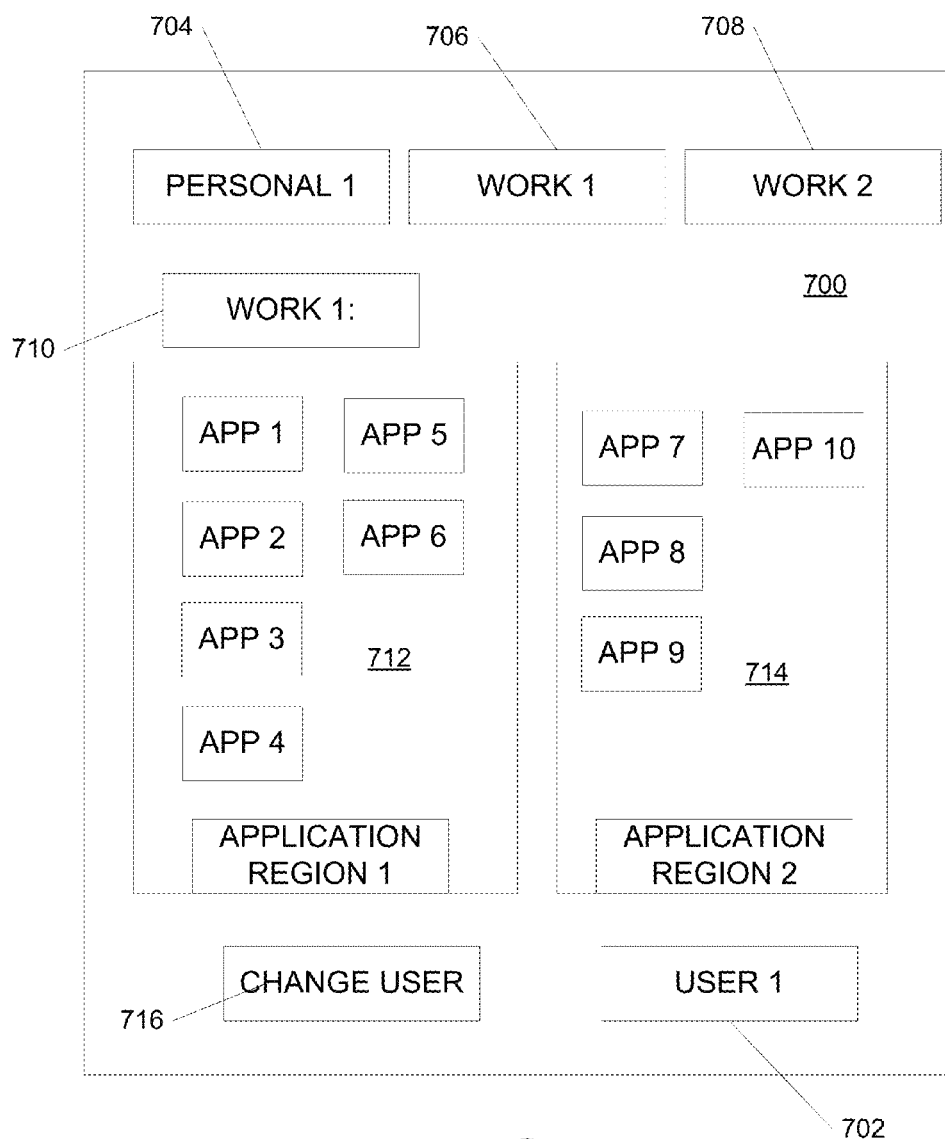
FIG. 7 illustrates one example user interface providing access to applications according to one or more aspects described herein.
Figure 8:
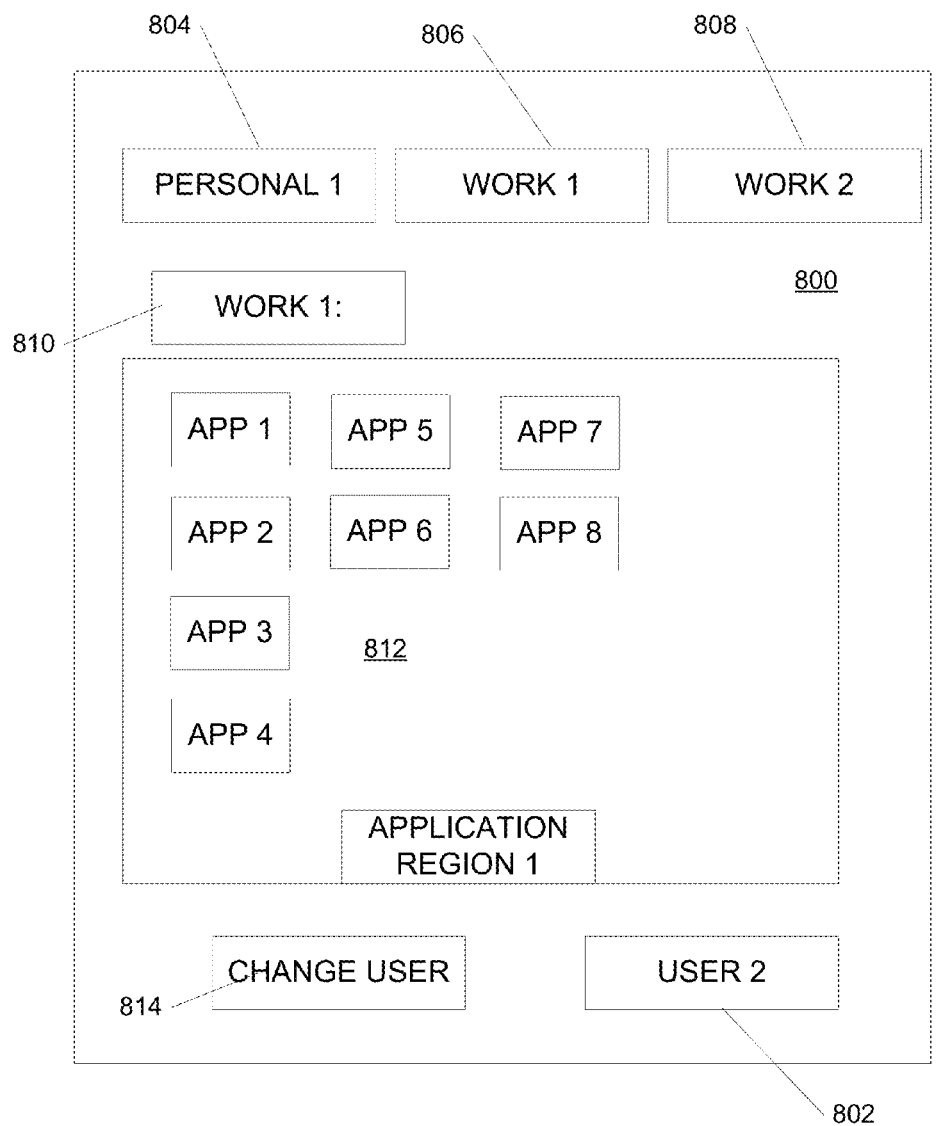
FIG. 8 illustrates another example user interface providing access to applications according to one or more aspects described herein.

FIGS. 6-8 illustrate another aspect of the application integration system described herein. In some arrangements, a device on which the system is implemented may provide for multiple user profiles accessing one or more applications on the device. For instance, a tablet computer may have multiple user profiles. When a user logs into the appropriate user profile, the user may access the integrated applications in an application region. In some instances, additional login might not be required in order to access one or more applications. In some examples, login for a user may also automatically connect various services, functionalities, and the like. Additionally or alternatively, some applications may be open and available to all users without requiring login and/or without being subject to any permissions and/or rules. For instance, a calculator application, a clock function, and the like, may be accessible by any user and, in some examples, without requiring login or authentication.

For instance, user interface 600 in FIG. 6 illustrates one example of providing a plurality of user profiles on a single device. As shown, four different users may access applications on the device. Selection of one of users 1-4, may prompt a login screen or other authentication process. Various known authentication processes may be used. The authentication process may be unique to the selected user.

In some examples, one of the user options available may be an administrator of the device. Accordingly, the administrator may be able to install or uninstall applications, access one or more other user profiles, manage the applications provided to each user, determine and/or manage rules and/or permissions, and the like. The administrator may be one of users 1-4 in FIG. 6 and may provide a way for the entity to configure and/or maintain rules, distribute rules to one or more devices, and/or manage application access to the rules. The administrator may also manage user profiles as well as device activation (e.g., per the determined rules). The administrator may have greater ability to modify the system than a typical user and may have access to additional functionalities upon login as an administrator.

FIG. 7 illustrates one example user interface 700 in which a user is presented with one or more applications. Upon login from user interface 600, the user may be presented with options for display of a desired application region or set of applications. For instance, user interface 700 indicates in field 702 that user 1 has logged in. User 1 may then select to view personal applications by selecting option 704, a first set of work applications by selecting option 706 or a second set of work applications by selecting option 708. The options 704, 706, 708 may allow a user to organize applications in a manner that is appealing or logical to the user to improve efficiency. Also, although three options are provided in the example discussed herein, more or fewer options may be provided without departing from the invention.

The applications provided in each option may be integrated such that user 1 may access data from various applications regardless of which option is selected, according to one or more rules, as discussed above. That is, for instance, selection of a personal email application may include a contact list from a work email application. As indicated in field 710, work 1 option has been chosen. Accordingly, Application region 1 712 is displayed, as well as application region 2 714. As discussed above, various rules may be implemented that permit communication and/or data sharing between application region 1 and application region 2, as well as between particular applications of each application region. Various rules may also be implemented that permit communication and/or data sharing between regions and/or applications considered personal applications (e.g., applications in option 704) and any of the options associated with work applications (e.g., options 706, 708).

Selection of change user option 716 may return the user to the login screen. Accordingly, selection of a different user may prompt another user interface. For instance, FIG. 8 illustrates a user interface 800 providing the applications associated with the profile for user 2, as indicated in field 802. Again, user 2 may select from personal applications with option 804, a first set of work application in option 806 and a second set of work applications in option 808. User 2 has selected work 1 option 806 as indicated in field 810. Accordingly, user 2's work 1 option is shown in application region 812. That is, the applications associated with this view for this user are provided. It should be noted that the view of work 1 applications for user 2 is different from that of user 1, as shown in FIG. 7. Similar to the display 700 in FIG. 7, a change user option 814 is provided. Selection of this option may return the user to the user selection interface 600 in FIG. 6.

In some arrangements, a user may be permitted to add applications downloaded to any application region, based on permissions provided by an administrator. For instance, the user may add a text editing application that is not obtained from the entity or employer (and thus considered a personal application rather than a work based application provided by the employer) in order to easily edit documents, such as contracts, when at a client or otherwise out of the office. If the user has permission from the administrator, this text editing application may be an integrated application and thus can communicate with one or more work applications, share data with one or more work applications, and the like. Once downloaded to a region, the application may be associated with any permissions, rules and the like that apply generally to all applications within the region. In some arrangements, for instance, work applications having very high security settings, the user may be prevented by an administrator, from associating the desired personal application with one or more work applications.

Allowing multiple user profiles on a single device may allow for a single device to be used by several individuals. For instance, in a work environment, some employees may often be travelling or visiting clients or customers. Accordingly, it would be advantageous to provide one or more devices that can be borrowed by the employee when the employee is leaving the office to visit the customer or client. Because multiple user profiles are provided on each device, the device may be used by various employees (thereby eliminating the need to have a device for each person) and the employee may be confident that all applications needed for him or her to conduct business will be provided in his or her user profile.

In some examples, the user profile, appearance of the interface, applications provided to each user may be customizable by the user. In still other arrangements, the data provided within one or more applications may be customizable to the needs of the user, as desired.

As discussed above, the various aspects of application integration described above will improve efficiency and provide for a more seamless work process when working in multiple applications. That is, providing a single login in to access multiple applications will reduce the time and inconvenience associated with having to login to each application individually. Further, permitting communication and/or data sharing between multiple integrated applications will improve access to information without requiring a user to work in multiple workspaces. Rather, information may be accessed seamlessly between integrated applications and in a secure manner based on the rules governing access to and communication between applications.

Further, the system may permit reduced access to one or more applications, functionalities, and the like. Similar to the arrangements discussed above in which various rules and permissions are generated, in some instances, it may be advantageous to prevent access to certain applications. For instance, if a device is provided by an employer for use by an employee, the employee, via the system described above, may integrate various applications, share data, and the like, between personal applications and work applications, according to various permissions and/or rules. If the device is confiscated by the employer for any reason, access to one or more personal applications may be prevented or closed off to the employer who has confiscated the device. The content therein might be inaccessible to the employer unless the employee user provides permission to access the content. In some examples, a user may, per his or her employment agreement, agreement accepted when downloading one or more work based applications, and the like, agree to provide access to applications and/or data, even if the device is confiscated. Accordingly, the system may maintain access for the employer in those situations.

For example, an employer may, in an employment agreement signed by the employee, state that all content associated with downloaded applications in the company or work applications regions, as well as company voicemail and phone records will be available to the employer at all times, regardless of the employment status of the employer. However, the agreement may further state that personal email (e.g., via an email provider not associated with the employer or entity), and the like, will not be accessible by the employer without user permission. In some arrangements, additional requirements for accessing this data may be provided, such as the information may be accessed by an administrator upon a showing of sufficient legal need. Accordingly, the system may control access to the data, applications, and the like, according to rules and/or permissions based on the rights granted in the employment agreement. Thus, if the device is confiscated by the employer, the system will prevent access to the employees, for instance, personal email account, unless the employee grants access to the employer.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description without departing from the invention.

What is claimed is:

1. An apparatus, comprising:
   at least one processor; and memory storing computer-readable instructions that, when executed by the at least one processor, cause the apparatus to:
- identify a first set of applications having a first set of permissions, the first set of permissions being based on a type of application of applications in the first set of applications;
- identify a second set of applications having a second set of permissions, the second set of permissions being different from the first set of permissions and being based on a type of application of applications in the second set of applications, the applications in the second set of applications being different from the applications in the first set of applications;
- integrate the first set of applications with the second set of applications in an application region, wherein the first set of applications and the second set of applications are configured to be in communication with each other and share data with each other within the application region; and
- define a third set of permissions for the application region and the integrated applications within the application region, the third set of permissions identifying rules for communication and data sharing between at least one application of the first set of applications and at least one application of the second set of applications.

2. The apparatus of claim 1, further including instructions that, when executed, cause the apparatus to:
provide access to the application region via an authentication process and access to the application region via the authentication process provides access to the at least one application of the first set of applications and the at least one application of the second set of applications.

3. The apparatus of claim 2, wherein providing access to the application region via the authentication process provides access to the at least one application of the first set of applications and the at least one application of the second set of applications within the application region without requiring an additional authentication process associated with the at least one application of the first set of applications or the at least one application of the second set of applications.

4. The apparatus of claim 1, wherein the rules for communication between the at least one application of the first set of applications and the at least one application of the second set of applications are based, at least in part, on the first set of permissions and the second set of permissions.

5. The apparatus of claim 1, wherein the first set of applications are work-based applications provided by a first entity and the second set of applications are personal applications.

6. The apparatus of claim 5, wherein the first set of permissions is controlled by the first entity and the second set of permissions is controlled by a second entity different from first entity.

7. The apparatus of claim 6, wherein the first set of permissions include a higher level of security than the second set of permissions.

8. The apparatus of claim 1, further including instructions that, when executed, cause the apparatus to:
- display a first portion of the integrated applications responsive to receiving authentication credentials associated with a first user; and
- display a second portion of the integrated applications responsive to receiving authentication credentials associated with a second user, the second portion including at least one application different from the first portion and the second user being different from the first user.

9. The apparatus of claim 8, wherein the first portion of the integrated applications and the second portion of the integrated applications are displayed on a same device.

10. One or more non-transitory computer-readable media having computer-executable instructions stored thereon that, when executed, cause at least one computing device to:
- identify a first set of applications having a first set of permissions, the first set of permissions being based on a type of application of applications in the first set of applications;
- identify a second set of applications having a second set of permissions, the second set of permissions being different from the first set of permissions and being based on a type of application of applications in the second set of applications, the applications in the second set of applications being different from the applications in the first set of applications;
- integrate the first set of applications with the second set of applications in an application region, wherein the first set of applications and the second set of applications are configured to be in communication with each other and share data with each other within the application region; and
- define a third set of permissions for the application region and the integrated applications within the application region, the third set of permissions identifying rules for communication and data sharing between at least one application of the first set of applications and at least one application of the second set of applications.

11. The one or more non-transitory computer-readable media of claim 10, further including instructions that, when executed, cause the computing device to:
provide access to the application region via an authentication process and access to the application region via the authentication process provides access to the at least one application of the first set of applications and the at least one application of the second set of applications.

12. The one or more non-transitory computer-readable media of claim 11, wherein providing access to the application region via the authentication process provides access to the at least one application of the first set of applications and the at least one application of the second set of applications within the application region without requiring an additional authentication process associated with the at least one application of the first set of applications or the at least one application of the second set of applications.

13. The one or more non-transitory computer-readable media of claim 10, wherein the rules for communication between the at least one application of the first set of applications and the at least one application of the second set of applications are based, at least in part, on the first set of permissions and the second set of permissions.

14. The one or more non-transitory computer-readable media of claim 10, wherein the first set of applications are work-based applications provided by a first entity and the second set of applications are personal applications.

15. The one or more non-transitory computer-readable media of claim 14, wherein the first set of permissions is controlled by the first entity and the second set of permissions is controlled by a second entity different from first entity.

16. The one or more non-transitory computer-readable media of claim 15, wherein the first set of permissions include a higher level of security than the second set of permissions.

17. The one or more non-transitory computer-readable media of claim 10, further including instructions that, when executed, cause the apparatus to:

display a first portion of the integrated applications responsive to receiving authentication credentials associated with a first user; and display a second portion of the integrated applications responsive to receiving authentication credentials associated with a second user, the second portion including at least one application different from the first portion and the second user being different from the first user.

18. The one or more non-transitory computer-readable media of claim 17, wherein the first portion of the integrated applications and the second portion of the integrated applications are displayed on a same device.

19. An apparatus, comprising:

at least one processor; and memory storing computer-readable instructions that, when executed by the at least one processor, cause the apparatus to:

identify a first set of applications having a first set of permissions;

identify a second set of applications having a second set of permissions, the second set of permissions being different from the first set of permissions, applications in the second set of applications being different from applications in the first set of applications;

integrate the first set of applications with the second set of applications in an application region, wherein the first set of applications and the second set of applications are configured to be in communication with each other and share data with each other within the application region; and define a third set of permissions for the application region and the integrated applications within the application region, the third set of permissions identifying rules for communication and data sharing between at least one application of the first set of applications and at least one application of the second set of applications;

provide, on a mobile device, a plurality of user profiles, each user profile including access to one or more applications;

receive, by the mobile device, user input selecting a first user profile of the plurality of user profiles, authenticate a first user associated with the selected first user profile on the mobile device;

upon authenticating the user, provide access to a first subset of the integrated first set of applications and second set of applications, the first subset being associated with the first user profile, wherein the first subset of applications include at least one of: a work application and a personal application associated with the first user;

receive user input selecting a second user profile of the plurality of user profiles;

authenticate a second user associated with the second user profile on the mobile device; and upon authenticating the second user, provide access to a second subset of the integrated first set of applications and second set of applications, the second subset being associated with the second user profile, wherein the second applications include at least one of a work application and a personal application associated with the second user and at least one application provided to the second user in the second subset is different from at least one application provided to the first user in the first subset.

20. The apparatus of claim 19, wherein the first user is different form the second user.

21. The apparatus of claim 19, wherein authenticating the second user includes preventing access to the first applications associated with the first user.

* * * * *